(12) United States Patent
Farhadiroushan et al.

(10) Patent No.: US 6,380,534 B1
(45) Date of Patent: Apr. 30, 2002

(54) DISTRIBUTED STRAIN AND TEMPERATURE SENSING SYSTEM

(75) Inventors: Mahmoud Farhadiroushan, London; Tom Richard Parker, Tiverton, both of (GB)

(73) Assignee: Sensornet Limited, Cambridgeshire (GB)

( * ) Notice: Subject to any disclaimer, the term of this patent is extended or adjusted under 35 U.S.C. 154(b) by 0 days.

(21) Appl. No.: 09/319,499
(22) PCT Filed: Dec. 16, 1997
(86) PCT No.: PCT/GB97/03454
   § 371 Date: Jun. 1, 1999
   § 102(e) Date: Jun. 1, 1999
(87) PCT Pub. No.: WO98/27406
   PCT Pub. Date: Jun. 25, 1998

(30) Foreign Application Priority Data

Dec. 16, 1996 (GB) .............................................. 9626099

(51) Int. Cl.[7] .............................. G02B 6/00; G01J 1/04
(52) U.S. Cl. ............................ 250/227.14; 250/227.23; 385/13
(58) Field of Search ................. 250/227.11, 227.14, 250/227.16, 227.18, 227.23, 227.26; 385/12, 13, 123; 356/73.1

(56) References Cited

U.S. PATENT DOCUMENTS 5,696,863 A * 12/1997 Kleinerman ........... 250/227.11

OTHER PUBLICATIONS

Waif PC et al; "Landau Placzek Ratio Applied to Distributed Fiber Sensing", OPICS Communications, vol. 122, No. 4/06, 01/96.
Toshio Kurashima; "Brillouin Optical–Fiber Time Domain Reflectometry", IEICE Transactions on Communication, vol. E76–B, No. 4, 04/93.
Development of a Distributed Sensing Technique Using Brillouin Scattering, J. of Lightwave Tech. vol. 13 No. 7 Jul. 1995.
Photoluminescence from Dye Molecules on Silver Gratings, Optics Communications Jan. 1, 1996.
Potential of Simulated Brillouin Scattering as Sensing Mechanism for Distributed Temp. Sensors; Electronics Letters Jul. 6, 1989.
Tensile Strain Dependence of Brillouin Frequency Shift in Silica Optical Fibers; IEEE Photonics Tech. Ltrs. 5/89.

* cited by examiner

Primary Examiner—Kevin Pyo
(74) Attorney, Agent, or Firm—Ronald B. Sherer; Bartlett & Sherer

(57) ABSTRACT

A method and apparatus for measuring the temperature and strain within a structure consists in having optical fibres incorporated in the structure, passing pulses of light down the fibre and detecting the backscattered light.

15 Claims, 4 Drawing Sheets

Figure 1:
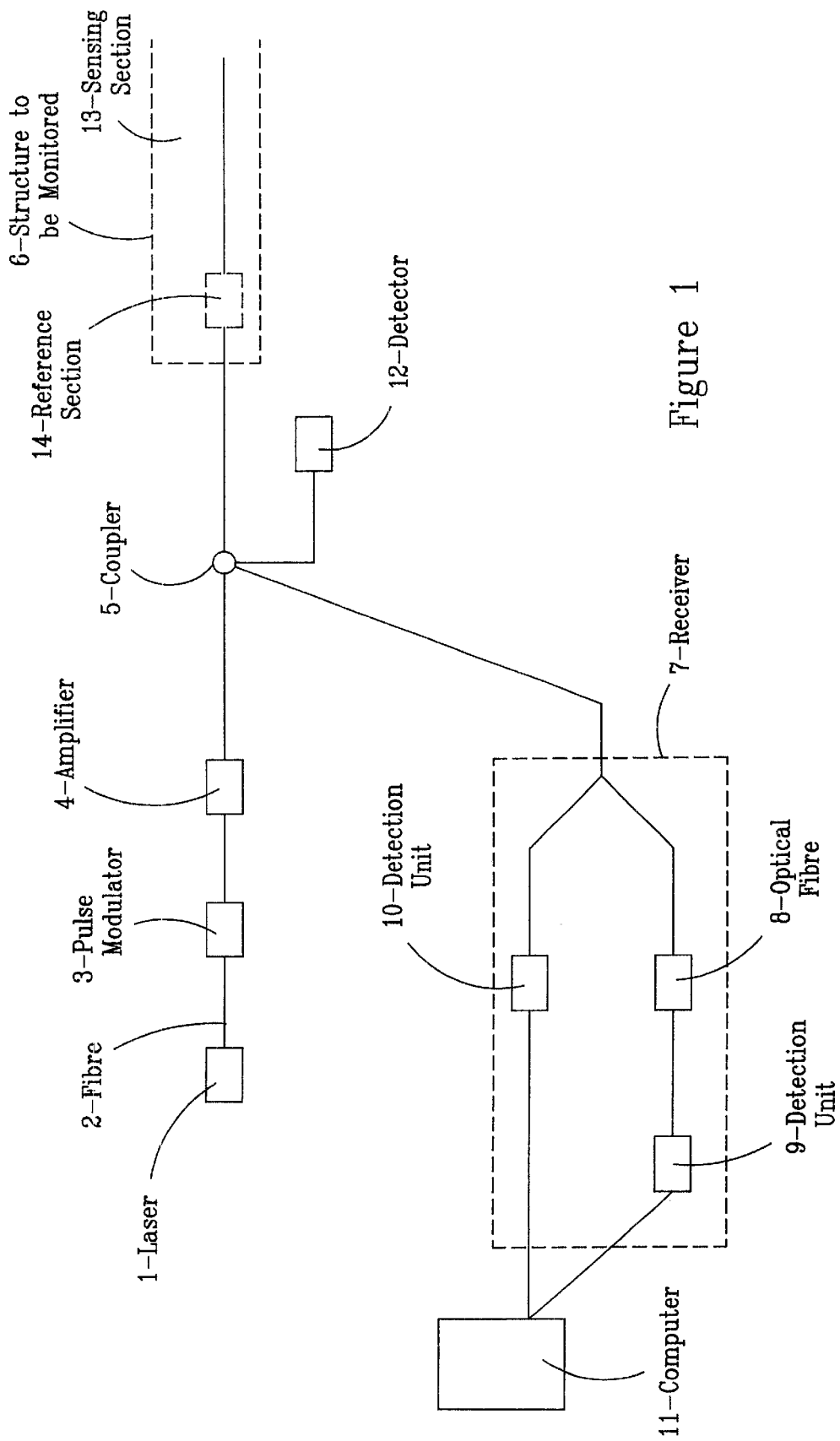

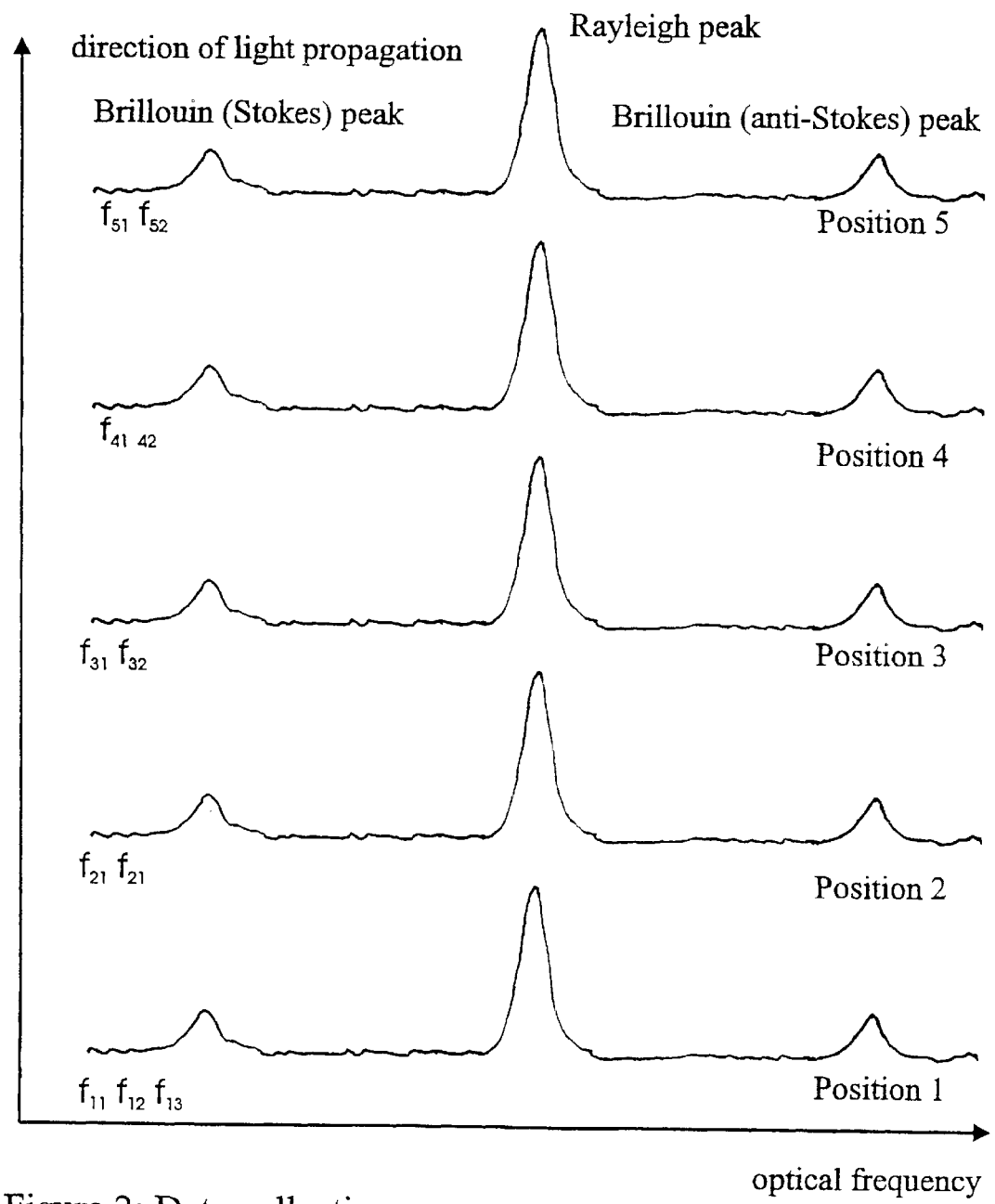
Figure 2: Data collection

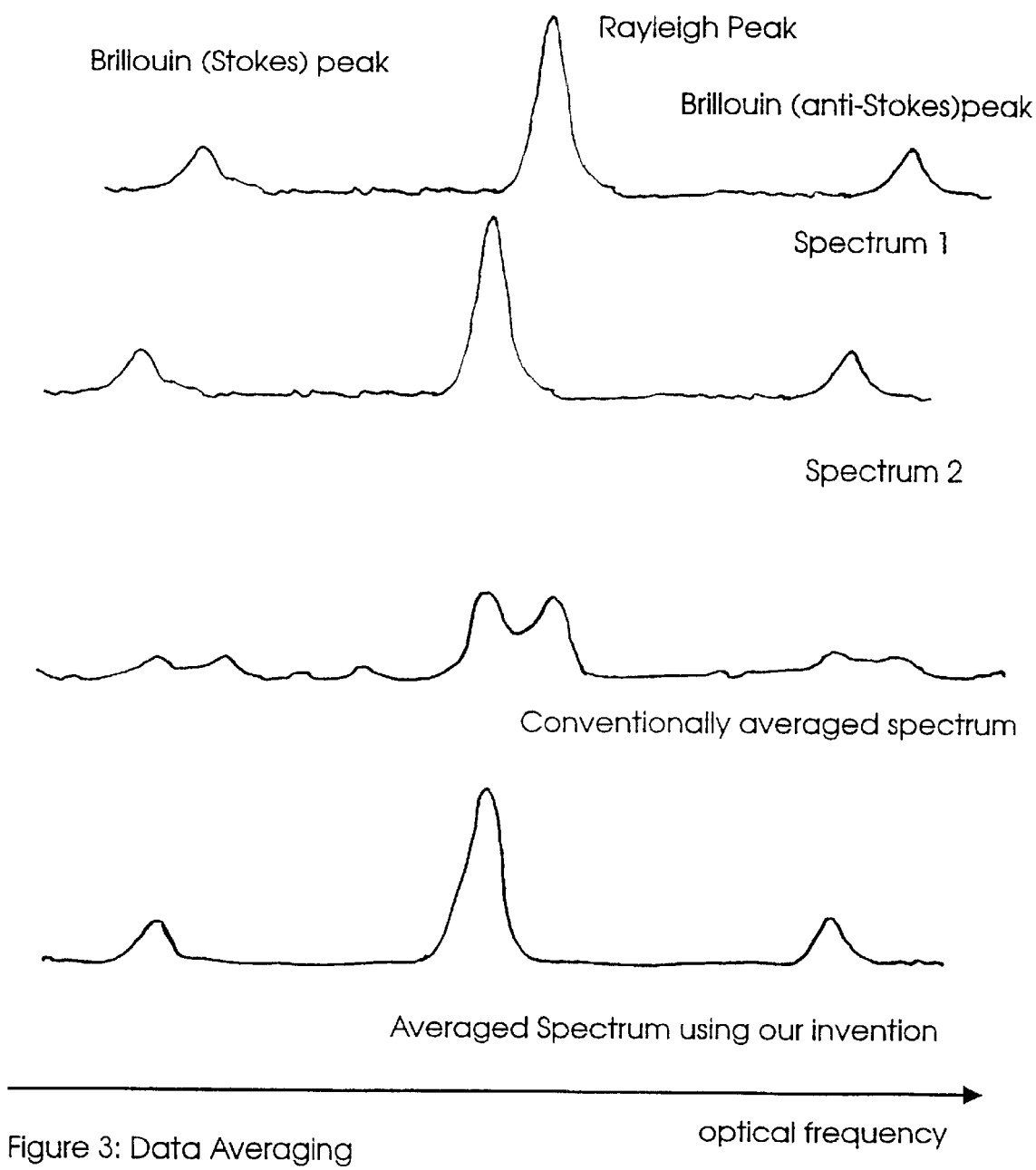
Figure 3: Data Averaging

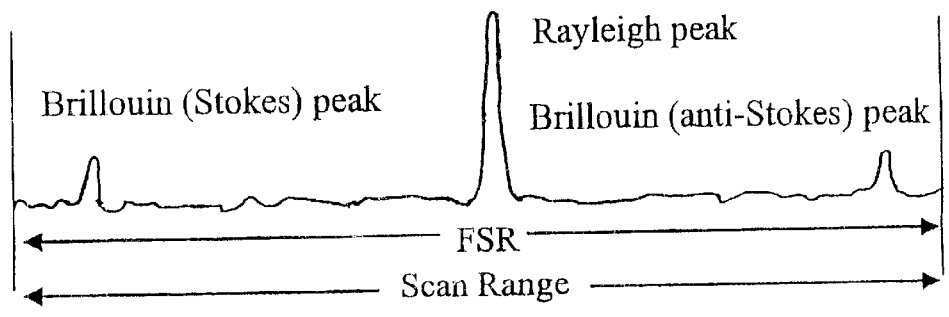
a) Conventional use of Optical filter
PRIOR ART
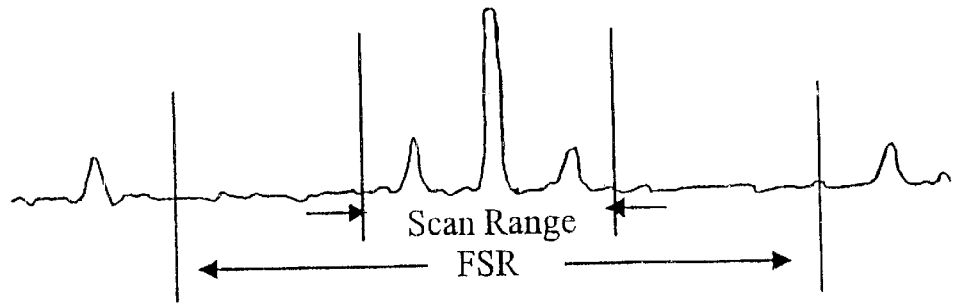
b) Our invention's use of optical filter
optical frequency
Figure 4 Use of optical filter

DISTRIBUTED STRAIN AND TEMPERATURE SENSING SYSTEM

The present invention relates to an apparatus for the simultaneous measurement of temperature and strain in optical waveguides and, in particular, relates to strain and temperature measurements in monomode optical fibres.

There is a need to monitor distributions of temperature and/or strain in many fields of engineering from power station steam pipes to smart structures and aircraft bodies. The sensors often need to cover large volumes, to be integrable into complex structures and to be immune from interference by electromagnetic fields. Optical-fibre sensors should be able to fulfil these requirements. Commercial sensing systems are available which use optical fibres to measure temperature distributions. However, these systems are not capable of measuring distributed strain. If strain could be measured then the fibres could be embedded into critical structures, such as aircraft components, bridges and dams and be used to give advance warning of possible failure. The measurement of strain would also allow the measurement of pressure, since the act of squeezing a fibre extends it. A particular application for such a system is in the field of oil exploration where the fibre can be used as a distributed pressure (and temperature) sensor down a bore hole.

Optical-fibre sensors which measure variations of a parameter along the fibre length can be divided into two classes: quasi-distributed and fully distributed. In quasi-distributed sensing, certain sections of the fibre are modified and used for local measurement and the rest is used simply to carry the light from sensor to sensor and, finally, to the detector. In fully distributed sensing, the fibre is unmodified and the whole length is used for light transmission and sensing. Fully distributed sensors are the more flexible and can be used with fibres already in place, allowing applications such as diagnostics of optical-fibre communication networks.

A possible technique for the fully distributed measurement of strain/temperature is based on the Brillouin effect. Here, a fraction of the optical power launched down a fibre is scattered at some point in the fibre, causing it to change optical wavelength and return towards the optical source. Critically, the wavelength of the returning light depends upon the strain/temperature of the fibre at the point at which the light was scattered. The wavelength of the returning light can then be measured to yield the strain/temperature in the fibre from the point at which the returning light was generated. If the incident light is launched as a short pulse, then by recording the wavelength of the returning light as a function of time, the strain/temperature at all points along the fibre can be measured.

There are two techniques which can be used to detect strain only, or temperature only, from the measurement of the Brillouin shift: (1) using a pump-probe system to produce frequency-dependent Brillouin power; (2) using optical heterodyning to detect the Brillouin signal. However, both methods require special arrangements of fibres to deconvolve the temperature and strain information. For example, one solution that has been suggested is, to pass a single fibre twice over the same region in such a way that one section is isolated from the strain and only affected by temperature. This approach makes the installation of the sensing optical fibre cable complicated and cannot be used with the existing optical fibre networks.

If it is desired to measure strain and temperature simultaneously along the same length of a single optical fibre, then both the amplitude and frequency shift of the Brillouin backscattered light has to be detected. Technique (1) would fail, as the stimulated Brillouin power produced would be practically independent of the temperature and strain due to the non-linear interaction of the pump and probe beams. Technique (2) would have difficulties due to polarisation noise-induced signal fading.

Another technique (3), used in the detection of temperature, is to measure the power of the Brillouin backscattered signal using a narrow bandwidth optical filter. However, this is not practical as: 1) amplitude variations due to drift in the optical filter response and the optical source wavelength; 2) strain cannot be determined from measuring only the Brillouin backscatter power.

We have devised a distributed sensing system which overcomes these difficulties.

The technique we have devised provides for referencing to overcome any optical filter or source frequency drift and to accurately detect both the amplitude and frequency of the Brillouin scattered light as a finction of time and, therefore, allowing simultaneous measurement of strain and temperature distributions along the same length of optical fibre.

According to the present invention there is provided apparatus for simultaneous measurement of temperature and strain distributions, which apparatus comprises a light source for generating pulses of light, a sensing network which comprises at least one optical fibre down which can pass pulses of light generated by the light source, a conversion means adapted to convert physical parameters into changes of strain or temperature along the sensing optical fibre thereby modifying the spectral response of the backscattered light passing back down the optical fibre (Brillouin backscatter and Rayleigh backscatter signals), a reference section subjected to known magnitude of the physical parameters, a receiver means in which a portion of returned light is passed on to a scanning optical filter able to resolve the Rayleigh peaks and Brillouin peaks and in which the optical signals are converted to electrical signals which are then fed into a processor means; the scan rate of the scanning optical filter being slower than the repetition of the optical pulses allowing the spectral light of the backscattered light to be recorded along the length of the optical fibre and both the amplitude and frequency shift of the Brillouin peaks relative to the Rayleigh peaks to be accurately measured from which temperature and strain distributions along the same length of optical fibre can be determined.

Light is transmitted down the optical fibre and backscattered light is transmitted back down the fibre. This light will be predominately of the same wavelength as the transmitted light (the Rayleigh peak), but some of the light will have a frequency shift due to the interaction of the energy of the vibrational state of the optical fibre and the light (the Brillouin peaks). There can be either addition of energy to the light, which gives backscattered light of a shorter wavelength (anti-Stokes scattering) or there can be removal of energy from the light which gives backscattered light of longer wavelength (Stokes scattering). The amplitude of the Brillouin peaks and the frequency shift of the Brillouin peaks compared with the Rayleigh peak is a measure of the strain and the temperature of the optical fibre at the position from where the light is backscattered.

The light source preferably generates coherent light in the visible or infrared spectrum, e.g. it is a laser, and conventional lasers can be used. The light source can be a narrow linewidth laser and it can be a solid-state laser, semiconductor laser diode or fibre laser source and it can include an external cavity for controlling the linewidth and the operating wavelength.

The modulating means pulses the light from the light source so that light is transmitted down the optical fibres in pulses, the light can be modulated using Q-switched, mod-elocked or direct modulation techniques or it may be modulated by an external modulator such as an acoustic optic modulator or an integrated optics modulator.

Preferably there is an amplifying means which can amplify the backscatter light and optical pulses. Optical amplifiers may be used to amplify the optical signals at the transmitter, receiver and in the sensing network means and the amplifiers may be solid state semiconductor or optical fibre amplifiers.

The conversion means converts the parameter to be measured to a strain or temperature change in the optical fibre, for example if movement within the structure is to be measured the conversion means can be means which attaches the fibre to the structure. For measuring pressure or detecting electric fields within the structure piezo electric devices can be incorporated. If microwave radiation is to be detected the fibre can be coated with a conductor such as graphite.

In order to improve the quality of the signals and to separate the Brillouin peaks from background noise, it is preferable to superimpose and average a series of signals so that an improved signal to noise is obtained. However, owing to variables such as drifts in optical filter response and source wavelength etc., this has not been conventionally practical. However, we have found that if the backscattered signal is normalised with reference to the Rayleigh peaks which are larger (about sixty times) than the Brillouin peaks and are relatively insensitive to temperature and strain and then the normalised signals averaged and superimposed, the Brillouin peaks are obtained with a much better signal to noise ratio.

The rate of scan of the optical filter is at a much slower rate than the pulse repetition rate of the pulses of light. This enables the wavelength spectra of the backscattered light to be recorded for each section along the optical fibre. The position from where the backscattered light comes is determined by the time interval between the transmission of the pulse and the return of the backscattered light.

In operation a pulse of light is transmitted down the optical fibre and the filter is set to a narrow bandwidth. when the return of backscattered light within this filter range is received at a noted time (which gives the location down the optical fibre of the position where the backscattered light comes from), the amplitude and the optical pass frequency are noted, by doing this for several time intervals and several optical pass frequencies, spectra at various locations along the optical fibre can be obtained. The filter is set so that the Rayleigh peak (which is at the frequency of the transmitted light) is detected and the bandwidth of the filter will also detect the Brillouin peaks. In operation the optical filter scans the wavelength across a range to detect the Brillouin peaks and the Rayleigh peaks. This process can be carried out for many locations down the optical fibre for each pulse of light.

The operating wavelength of the optical source means and/or the dispersion characteristics of the sensing optical fibres may be adjusted in such a way that the pulse and generated forward scatter Raman Stokes signals travel down the optical fibre with different propagation velocities and they walk-off over a sufficient length to avoid stimulated Raman scattering and thereby allowing high pump powers and longer sensing optical fibres to be used.

There is section of the optical fibre at a known temperature and strain which can be used as a reference and by measuring the amplitude and frequency shift of the Brillouin peaks for the reference section to calibrate the data received from other points into temperature and strain measurements.

Preferably a filter such as an interference filter, e.g. as a Fabry-Perot interferometer, is used to resolve the Brillouin spectrum. Conventionally, such interferometers are chosen such that the entire spectrum of interest lies within one free spectral range (FSR) of the interferometer. The FSR is the frequency range within which all spectral information will be displayed such that any peaks with frequency outside the FSR will still be displayed inside the FSR. However, this is conventionally undesirable as it may lead to an unpredictable overlapping of peaks. Preferably in the present invention, the FSR is chosen to be less than the Brillouin shift. This enables some of the frequency band between the Brillouin peaks and the Rayleigh peak not to be scanned and so a much smaller scan range can be used to capture the spectral response.

For the same spectral resolution, this technique requires the collection of around one hundredth of the points required by the conventional technique. Since the data are usually handled many times in data processing programs, this yields a great saving on the time required to make the strain and temperature measurements.

In order to measure the temperature, the ratio of the amplitude of the Brillouin peaks against the Rayleigh peaks is measured and the frequency shift is a measure of the strain.

The optical signals obtained are converted into electrical signals, fed into a computer and recorded in the desired form. The reference signal is generated by the reference section and this is preferably fed into the same computer.

The detection means may be low-noise photodetectors with internal gain such as avalanche photodiodes.

In order to form a larger sensing network, a plurality of optical fibres or optical fibre cables can be dispersed in the structure to be monitored, e.g. a pipe circuit or downhole in a rock formation. By use of the apparatus and method of the invention, the temperature and strain can be measured at any point.

The measurements are calibrated with respect to the spectral response of the sensing section and the strain and temperature distribution along the sensing fibre are computed by measuring the relative amplitude and position of Brillouin peaks.

The invention is described with reference to the accompanying drawings in which:

FIG. 1 is a diagram of an embodiment of the present invention, in which optical fibres are used and the source means is externally modulated and then amplified.

FIGS. 2, 3, 4(a) and 4(b) are diagrams of traces of backscattered light recorded at different scanning positions of the optical filter means showing how the spectral responses at different sensing locations are computed and the drift in the optical filter and the source wavelength are corrected for, prior to signal averaging.

Referring to FIG. 1, a light source (1) comprising a laser is connected by optical fibre (2) to a pulse modulator (3) which transmits light in pulses and then to light amplifier (4). The optical fibre passes through coupler (5).

In the structure to be monitored, shown generally at (6), the optical fibre (2) is fed through the structure where the strain and temperature is to be measured. There is a reference section at (14) where the temperature and strain is known to be used as a calibration measurement.

A detection means (12) may be used to monitor the light transmitted to the sensing network means (6). At the receiver unit (7), a portion of the backscattered light is passed onto a scanning optical filter (8) which selects a narrow range of wavelengths. The optical power of the selected wavelength range is measured and converted to electrical signals using the detection unit (9). Another portion of light is also directly monitored with a detection unit (10) for measuring the Rayleigh backscattered light for each measurement point. A computing means (11) records the returned backscattered light as a function of time. The optical filter (8) is scanned at a slower rate compared to the pulse repetition rate of the source means (1). This allows the backscattered light to be captured at different selected wavelengths by sending many optical pulses during one scan cycle. The backscattered traces are combined to construct the full spectral response of the backscattered light along the sensing fibre, as indicated in FIG. 2. Each spectral response, corresponding to a different section of fibre, is normalised with reference to its Rayleigh peak which is insensitive to temperature and strain and is relatively immune to signal noise. In addition, the output of detection unit (10) can be used to normalise each measurement point relative to Rayleigh signal and to compare it with the Rayleigh peaks detected with detection unit (9) after passing through optical filter (8) to improve the measurement accuracy. The measurements are calibrated with respect to the spectral response of the sensing section (13) and the strain and temperature distribution along the sensing fibre are computed by measuring the relative amplitude and position of Brillouin peaks.

Referring to FIGS. 2, 3 and 4:

FIG. 2

The figure shows the results from positions 1 to 5 on the optical fibre (13). As an optical pulse propagates down the waveguide. the pass frequency of the optical filter is noted and the returning signal is measured as a function of time. After a short time, to allow the pass frequency of the filter, which is scanning slowly, to increase, a second pulse is launched, the pass frequency is again noted and the returning signal is again measured as a function of time. Referring to position 1 the filter is set to the frequency $f_1$ and the amplitude of the backscattered light at that frequency is measured, this is repeated for frequencies $f_2$, $f_3$ etc. to obtain the spectrum at position 1 shown as $f_{11}$, $f_{12}$ and $f_{13}$ etc. Corresponding measurements are simultaneously made for each pulse at positions 2 to 5 along the optical fibre (13), the result for position 2 is shown as $f_{21}$, $f_{22}$; the result for position 3 is shown as $f_{31}$, $f_{32}$; the result for position 4 is shown as $f_{41}$, $f_{42}$; the result for position 5 is shown as $f_{51}$, $f_{52}$ respectively.

The process is continued until the entire frequency spectrum is collected. A computer program then transposes the data such that it is stored in arrays containing the frequency spectra at the positions of interest in the fibre (the frequency spectra shown at positions 1–5 in the FIG.). A peak detection program then measures the height of the peaks and their mutual frequency separation and from this the temperature and strain at the positions of interest (here positions 1–5) are deduced. The process used to average the data, if required, is specified in FIG. 3.

FIG. 3

This figure illustrates the averaging technique for obtaining better spectra. For each filter scan the spectrum at each location may be slightly displaced so that if they are averaged the type of spectrum shown in spectrum 3 is obtained.

Spectra 1 and 2 represent frequency spectra recorded from the same position in the fibre, at different times, with the purpose of averaging the spectra to reduce noise. Due to the drifts of optical filters, laser sources and variations in the scan position etc. the spectra appear to have shifted relative to one another. If conventional averaging were used, this would cause significant broadening of the processed spectrum and so give inaccurate temperature and strain measurement as shown in spectra 3.

A technique is used whereby peak detection scheme finds the dominant Rayleigh peak and "shifts" the spectra to be averaged such that the Rayleigh peaks of each spectra are overlaid this gives the improved result shown in spectra 4. This technique is reliable as (1) the Rayleigh peak is insensitive to temperature and strain; (2) the Rayleigh peak is large (about sixty times larger than the Brillouin peaks) and so relatively immune from noise; (3) any filter drift affects the peaks equally.

FIG. 4

The conventional use of an optical filter in analysing the Brillouin spectrum is shown in FIG. 4a. Here the FSR is greater than the frequency difference between the Brillouin peaks, and many data points have to be collected to capture the spectral response. In this embodiment, the FSR is chosen to be less than the Brillouin shift. Here the Brillouin peaks are "projected back" and a much smaller scan range is used to capture the whole spectrum.

For the same spectral resolution, this technique requires the collection of around one hundredth of the points required by the conventional technique. Since the data are usually handled many times in data processing programs, this yields a great saving on the time required to make the strain and temperature measurements.

What is claimed is:

1. Apparatus for simultaneous measurement of temperature and strain distributions, which apparatus comprises a light source for generating pulses of light, a sensing network which comprises at least one optical fibre down which can pass pulses of light generated by the light source, a conversion means adapted to convert physical parameters into changes of strain or temperature along the sensing optical fibre thereby modifying the spectral response of the backscattered light passing back down the optical fibre as Brillouin backscatter and Rayleigh backscatter signals, a reference section of optical fibre subjected to known magnitude of the physical parameters, a receiver means in which a portion of returned light is passed on to a scanning optical filter able to resolve the Rayleigh peaks and Brillouin peaks and in which the optical signals are converted to electrical signals which are then fed into a processor means; the scan rate of the scanning optical filter being slower than the repetition rate of the optical pulses, allowing the spectral light of the backscattered light to be recorded along the length of the optical fibre and both the amplitude and frequency shift of the Brillouin peaks relative to the Rayleigh peaks able to be accurately measured from which measurements temperature and strain distributions along the same length of optical fibre can be determined.

2. Apparatus as claimed in claim 1, in which the light source is a laser which generates light in the visible or infra red spectrum.

3. Apparatus as claimed in claim 1, in which there is an amplifying means which amplifies the back scatter light and optical pulses.

4. Apparatus as claimed in claim 1, in which the conversion means is able to convert the amplitude and frequency shift of the Brillouin peaks relative to the Rayleigh peaks to a strain or temperature change in the optical fibre.

5. Apparatus as claimed in claim 1, in which there is an interference filter to resolve the Brillouin spectrum.

6. A sensing network for monitoring a structure in which there is a network of optical fibres dispersed in the structure which network comprises apparatus as claimed in claim 1.

7. Apparatus as claimed in claim 3, in which there is an interference filter to resolve the Brillouin spectrum.

8. A sensing network for monitoring a structure in which there is a network of optical fibres dispersed in the structure which network comprises apparatus as claimed in claim 4.

9. Apparatus as claimed in claim 5, in which the free spectral range of the interference filter is less than the Brillouin shift of the backscattered light.

10. Apparatus as claimed in claim 7, in which the free spectral range of the interference filter is less than the Brillouin shift of the backscattered light.

11. A sensing network for monitoring a structure in which there is a network of optical fibres dispersed in the structure which network comprises apparatus as claimed in claim 7.

12. A method for the simultaneous measurement of temperature and strain distributions in a structure which comprises generating pulses of light, passing the pulses of light down a sensing network which comprises at least one optical fibre incorporated in the structure, converting physical parameters into changes of strain or temperature along the sensing optical fibre thereby modifying the spectral response of the backscattered light passing back down the optical fibre as Brillouin backscatter and Rayleigh backscatter signals detecting the backscattered light and resolving the Rayleigh peaks and Brillouin peaks of the backscattered light and converting the optical signals to electrical signals which are then fed into a processor means; there being a reference section subjected to known magnitude of the physical parameters, in which method a portion of returned light is passed on to a scanning optical filter which has a scan rate slower than the repetition rate of the optical pulses, recording the spectral light of the backscattered light along the length of the optical fibre and measuring both the amplitude and frequency shift of the Brillouin peaks relative to the Rayleigh peaks and by comparing with the signals from the reference section determining the temperature and stain distributions along the length of optical fibre.

13. A method as claimed in claim 12, in which a plurality of back scattered signals are superimposed by normalising each backscattered signal with reference to the Rayleigh peak and superimposing and averaging the normalised signals to obtain an average value.

14. A method as claimed in claim 12, in which the position along the fibre from where the backscattered light comes is determined by the time interval between the transmission of the pulse and the return of the backscattered light.

15. A method as claimed in claim 13, in which the position along the fibre from where the backscattered light comes is determined by the time interval between the transmission of the pulse and the return of the backscattered light.

* * * * *